US007575246B1

(12) United States Patent
Lunski

(10) Patent No.: US 7,575,246 B1
(45) Date of Patent: Aug. 18, 2009

(54) CONTAINER WHEEL ATTACHMENT SYSTEM

(76) Inventor: John G. Lunski, 2534 Clover Dr., Grand Forks, ND (US) 58201

( * ) Notice: Subject to any disclaimer, the term of this patent is extended or adjusted under 35 U.S.C. 154(b) by 101 days.

(21) Appl. No.: 11/828,836

(22) Filed: Jul. 26, 2007

(51) Int. Cl.
*B62B 1/12* (2006.01)
(52) U.S. Cl. .................. 280/651; 280/47.16; 220/630
(58) Field of Classification Search ............ 280/33.998, 280/62, 78, 763.1, 767, 638, 35, 639, 37, 280/38, 641, 43, 43.1, 47.131, 47.16; 220/908, 220/629, 630
See application file for complete search history.

(56) References Cited

U.S. PATENT DOCUMENTS

| 722,569 | A | * | 3/1903 | Dilger ..................... 280/47.3 |
| 785,029 | A | * | 3/1905 | Vore ....................... 280/47.3 |
| 918,636 | A | * | 4/1909 | Young ..................... 188/72.8 |
| 1,374,372 | A | * | 4/1921 | Freund .................... 294/15 |
| 1,676,381 | A | | 7/1928 | Callison |
| 1,875,965 | A | * | 9/1932 | Waters ..................... 292/73 |
| 2,305,284 | A | * | 12/1942 | Trabant ................ 280/47.131 |
| 2,345,381 | A | * | 3/1944 | Chenette ................. 280/47.35 |
| 2,521,819 | A | * | 9/1950 | Baer ....................... 280/35 |
| 3,837,666 | A | | 9/1974 | Hodson |
| 4,026,569 | A | | 5/1977 | Staal |
| 4,135,725 | A | | 1/1979 | DiRoma |
| 4,313,612 | A | | 2/1982 | Rubens |
| 4,336,630 | A | * | 6/1982 | Page ....................... 16/35 R |
| 4,772,035 | A | * | 9/1988 | Danial .................... 280/47.3 |
| 5,136,751 | A | | 8/1992 | Coyne et al. |
| 5,167,351 | A | * | 12/1992 | Prout et al. .............. 220/840 |
| D347,095 | S | * | 5/1994 | Apps et al. .................. D34/5 |
| 5,402,864 | A | * | 4/1995 | Block et al. ............... 188/19 |
| 5,427,393 | A | * | 6/1995 | Kriebel ................. 280/47.28 |
| 5,704,625 | A | | 1/1998 | Presnell et al. |
| 5,816,591 | A | * | 10/1998 | Parker et al. ........... 280/47.34 |
| 5,873,145 | A | * | 2/1999 | Chou ....................... 16/46 |
| 5,899,468 | A | * | 5/1999 | Apps et al. ............. 280/47.26 |
| 5,940,932 | A | * | 8/1999 | LaHay ..................... 16/30 |
| 6,279,705 | B1 | * | 8/2001 | Wu ......................... 280/37 |
| 6,309,167 | B1 | * | 10/2001 | McPherrin ............... 414/457 |
| 6,592,133 | B2 | | 7/2003 | Powell |
| 6,688,614 | B2 | * | 2/2004 | Hsu ......................... 280/37 |
| 6,961,976 | B2 | * | 11/2005 | Kuo ..................... 280/79.11 |

* cited by examiner

*Primary Examiner*—Christopher P Ellis
*Assistant Examiner*—Chiedu A Chibogu

(57) ABSTRACT

A container wheel attachment system for efficiently increasing the stability and maneuverability of various containers. The container wheel attachment system generally includes a support structure including an inner portion, an outer portion and a channel, wherein the inner portion includes an upper inner end and a lower inner end and wherein the outer portion includes an upper outer end and a lower outer end. The upper inner end is adjacent the upper outer end upon the support structure and the lower inner end is adjacent the lower outer end upon the support structure. The channel extends between the upper inner end of the inner portion and the upper outer end of the outer portion. At least one wheel extends adjacent from the lower inner end of the inner portion and the lower outer end of the outer portion.

16 Claims, 6 Drawing Sheets

CONTAINER WHEEL ATTACHMENT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to containers and more specifically it relates to a container wheel attachment system for efficiently increasing the stability and maneuverability of various containers.

2. Description of the Related Art

Any discussion of the prior art throughout the specification should in no way be considered as an admission that such prior art is widely known or forms part of common general knowledge in the field.

Containers for use with refuse, recyclable and various other materials have been in use for years. Typically, containers are manufactured in various sizes and shapes and are utilized for various purposes. Many containers that are utilized for refuse or recyclable material include a pair of wheels positioned upon one side of the container. The wheels assist the user in transporting the container from place to place, wherein the user generally tilts the container and pulls or pushes the container upon the wheels when transporting the container.

It can be difficult to tilt larger containers upon the pair of wheels, wherein the larger containers (when full) can be very heavy. Trying to maneuver the large container by yourself can cause strain upon the user's back or other muscles. It may also be difficult to stabilize the container upon the rear wheels. Because of the general lack of efficiency and practicality in the prior art there is the need for a new and improved container wheel attachment system for efficiently increasing the stability and maneuverability of various containers.

BRIEF SUMMARY OF THE INVENTION

The general purpose of the present invention is to provide a container wheel attachment system that has many of the advantages of the containers mentioned heretofore. The invention generally relates to a container which includes a support structure including an inner portion, an outer portion and a channel, wherein the inner portion includes an upper inner end and a lower inner end and wherein the outer portion includes an upper outer end and a lower outer end. The upper inner end is adjacent the upper outer end upon the support structure and the lower inner end is adjacent the lower outer end upon the support structure. The channel extends between the upper inner end of the inner portion and the upper outer end of the outer portion. At least one wheel extends adjacent from the lower inner end of the inner portion and the lower outer end of the outer portion.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a container wheel attachment system for efficiently increasing the stability and maneuverability of various containers.

Another object is to provide a container wheel attachment system that easily attaches to a container.

An additional object is to provide a container wheel attachment system that swivels to allow for easier maneuverability.

A further object is to provide a container wheel attachment system that is removably attached to the container.

Another object is to provide a container wheel attachment system that decreases the noise created from pushing the container, wherein it is quieter to roll the container upon 3 wheels versus only 2 wheels.

Another object is to provide a container wheel attachment system that is fixedly attached to the container.

Another object is to provide a container wheel attachment system that is fixedly attached to the container and includes a mechanism to engage and disengage the wheel(s) as desired.

Another object is to provide a container wheel attachment system that is integrally formed with the container.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
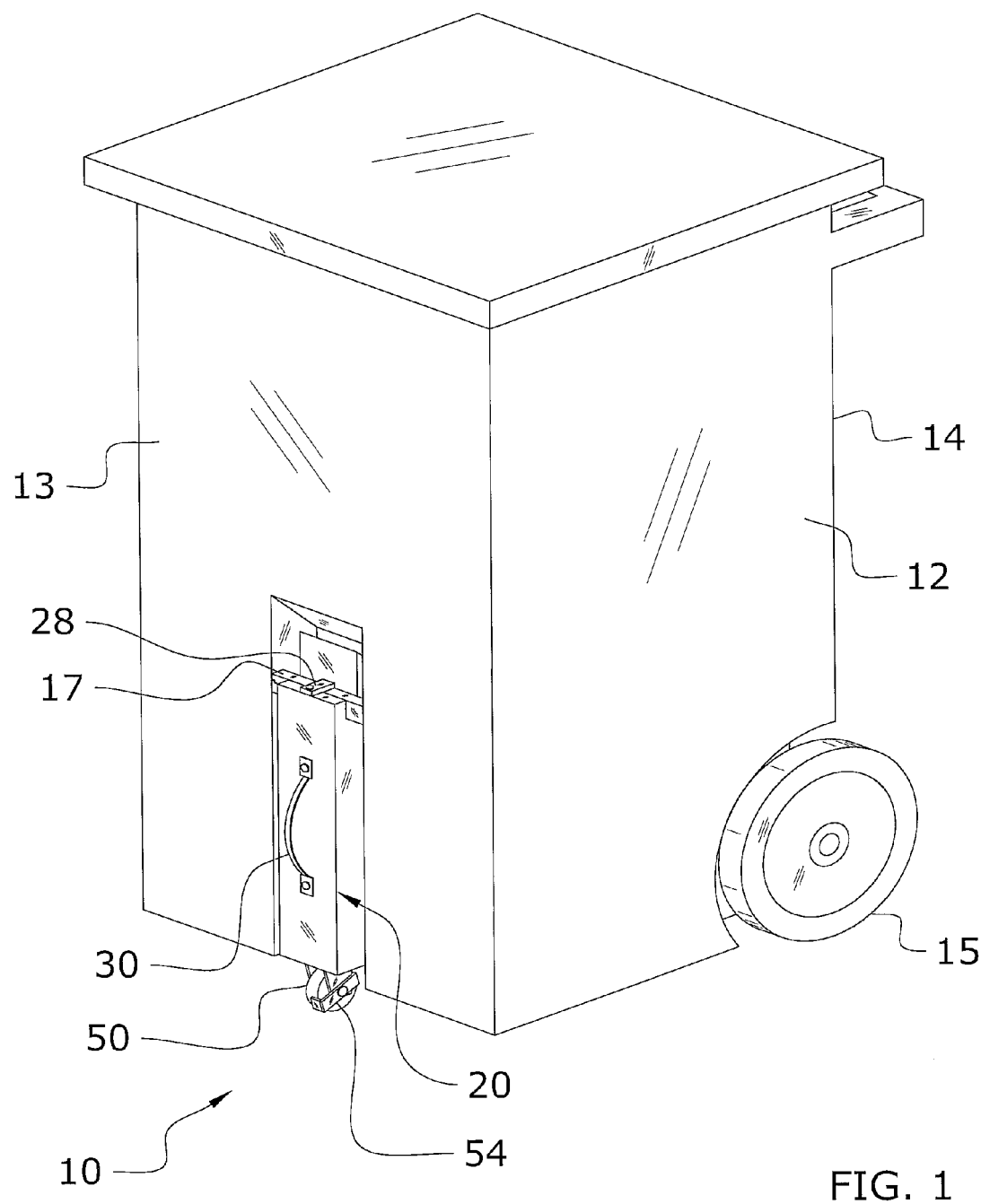
FIG. 1 is an upper perspective view of the present invention in use.

Turning now descriptively to the drawings, in which similar reference characters denote similar elements throughout the several views, FIGS. 1 through 6 illustrate a container wheel attachment system 10, which comprises a support structure 20 including an inner portion 21, an outer portion 22 and a channel 29, wherein the inner portion 21 includes an upper inner end 23 and a lower inner end 24 and wherein the outer portion 22 includes an upper outer end 25 and a lower outer end 26. The upper inner end 23 is adjacent the upper outer end 25 upon the support structure 20 and the lower inner end 24 is adjacent the lower outer end 26 upon the support structure 20. The channel 29 extends between the upper inner end 23 of the inner portion 21 and the upper outer end 25 of the outer portion 22. At least one wheel 50 extends adjacent from the lower inner end 24 of the inner portion 21 and the lower outer end 26 of the outer portion 22.

The container 12 utilized with the present invention is preferably comprised of a container 12 commonly utilized for holding refuse and recyclable materials as illustrated in FIG. 1. It is appreciated that the container 12 may be utilized for various purposes rather than those described. The container 12 is also preferably comprised of a container 12 commonly maneuvered by tipping the container 12 upon the rear wheels 15, wherein the container 12 is subsequently pulled or pushed to a destination.

The container 12 includes a front portion 13 and a rear portion 14, wherein the container 12 preferably includes a pair of rear wheels 15 adjacent the rear portion 14 of the base of the container 12. The container 12 also preferably includes a recessed portion 16 extending within the front portion 13 of the container 12. The recessed portion 16 is parallel with a longitudinal axis of the container 12 and is also preferably centrally spaced with the front portion 13. The recessed portion 16 further extends within the base of the container 12. A support member 17 also preferably extends across the recessed portion 16 as illustrated in FIG. 1.

B. Support Structure

The support structure 20 is preferably comprised of a configuration to be removably attached to the container 12; however it is appreciated that the container 12 may be fixedly attached to the container 12. The support structure 20 also preferably attaches to the container 12 within the recessed portion 16 of the container 12. The support structure 20 is comprised of a rigid material that may withstand excessive amounts of weight (e.g. 200 lbs, 300 lbs, etc.), such as but not limited to plastic, metal or wood.

The support structure 20 is comprised of an elongated configuration as illustrated in FIGS. 1 through 6. The support structure 20 includes an inner portion 21 and an outer portion 22. A longitudinal axis of the inner portion 21 is coplanar with a longitudinal axis of the outer portion 22. The inner portion 21 includes an upper inner end 23 and a lower inner end 24 and the outer portion 22 includes an upper outer end 25 and a lower outer end 26.

The upper inner end 23 is preferably adjacent the upper outer end 25 and the lower inner end 24 is preferably adjacent the lower outer end 26. The inner portion 21 and the outer portion 22 are preferably comprised of an integrally formed structure; however it is appreciated that the inner portion 21 and the outer portion 22 may be comprised of separate structures.

A channel 29 is also defined between the inner portion 21 and the outer portion 22 as illustrated in FIGS. 2 through 5. The channel 29 further extends between an extending portion 27 of the outer portion 22 and the inner portion 21. The extending portion 27 and channel 29 are further positioned adjacent the upper inner end 23 and the upper outer end 25 of the support structure 20. The channel 29 is also preferably perpendicular to a longitudinal axis of the support structure 20.

An upper securing member 28 preferably extends from the extending portion 27 and within the channel 29 as illustrated in FIGS. 1 through 6. The upper securing member 28 serves to secure the support member 17 of the container 12 within the channel 29. The upper securing member 28 preferably selectively rotates (via a fastener) about the extending portion 27 to selectively secure the support member 17 of the container 12 within the channel 29. The upper inner end 23 of the inner portion 21 also preferably extends upwardly past the outer portion 22 and extending portion 27 to serve as an inner support for the support structure 20 against an inner wall of the recessed portion 16 of the container 12.

The upper inner end 23 also includes a slanted portion as illustrated in FIGS. 2 through 6. The upper inner end 23 is slanted to accommodate various containers 12 and subsequently allow the present invention to attach to containers 12 of various configurations. The lower inner end 24 and the lower outer end 26 are also preferably flush with one another, wherein the connecting structure 52 of the wheel 50 attaches to the lower inner end 24 and the lower outer end 26. The lower end 24, 26 (i.e. base) is also preferably flush with the base of the container 12.

Figure 2:
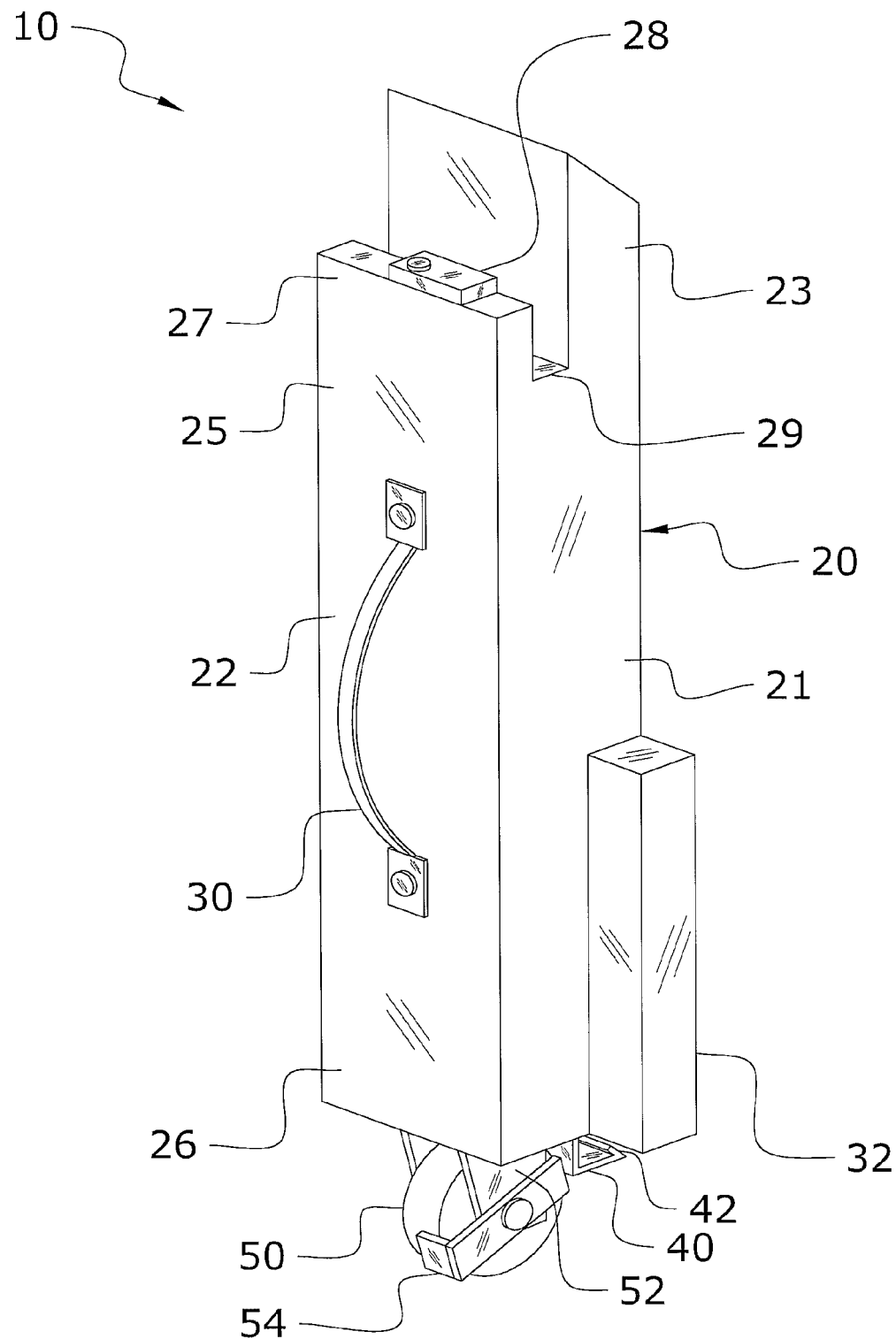
FIG. 2 is an upper perspective view of the present invention.
Figure 6:
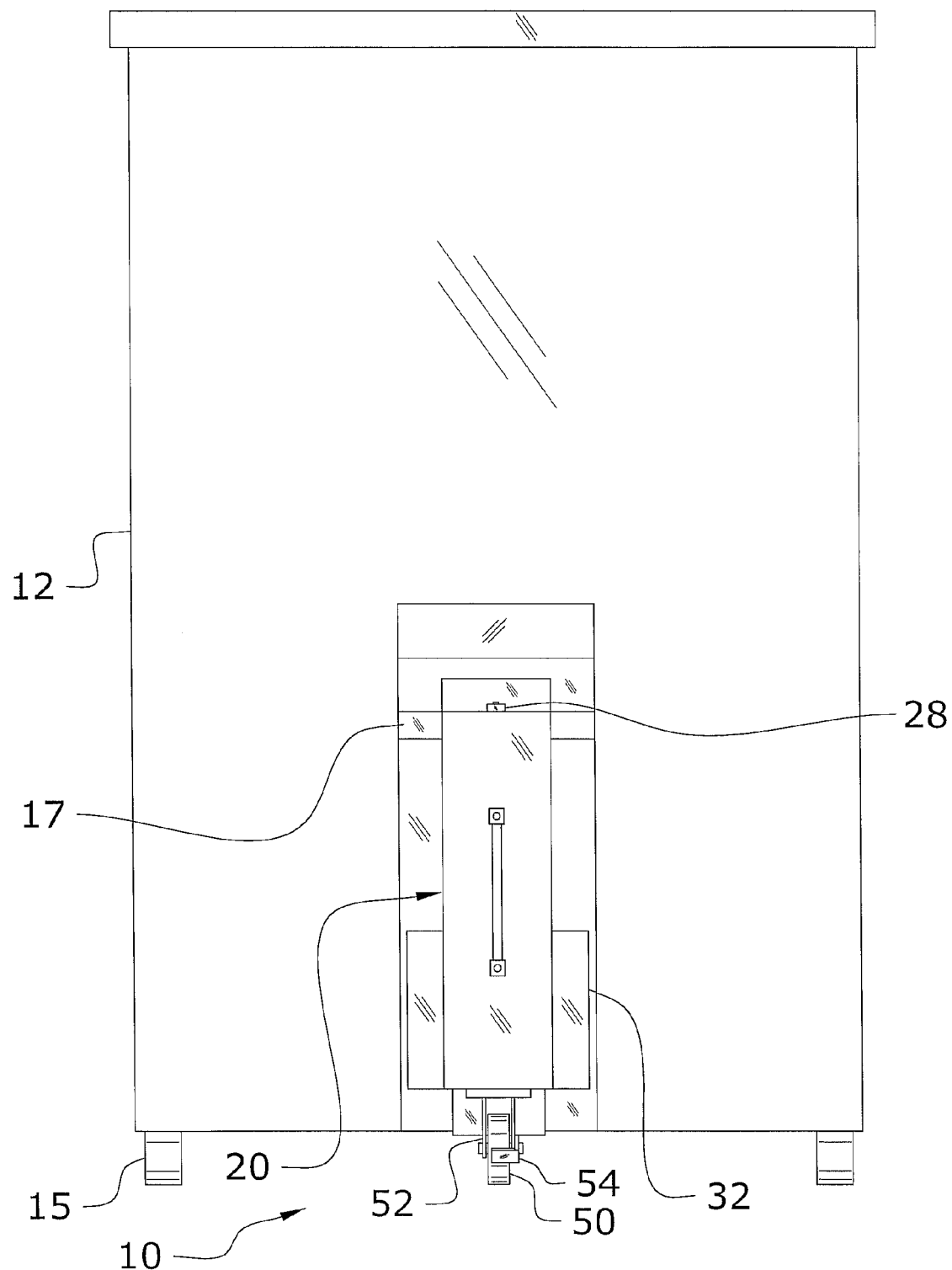
FIG. 6 is a front view of the present invention attached to the container.

The support structure 20 also preferably includes a pair of spacer members 32 extending outwardly from opposing sides of the inner portion 21 as illustrated in FIGS. 2 and 6. The spacer members 32 engage opposing sidewalls of the recessed portion 16 and serve to stabilize the support structure 20 within the recessed portion 16. The inner portion 21 and the spacer members 32 are preferably comprised of an integrally formed structure; however it is appreciated that the inner portion 21 and the spacer members 32 may be comprised of separate structures.

The support structure 20 also preferably includes a handle 30 extending outwardly from the outer portion 22 opposite the inner portion 21 as illustrated in FIGS. 1 through 6. The handle 30 allows the support structure 20 to be easily carried when not in use. The outer portion 22 and the handle 30 are preferably comprised of an integrally formed structure; however it is appreciated that the outer portion 22 and the handle 30 may be comprised of separate structures.

C. Lower Securing Member

Figure 3:
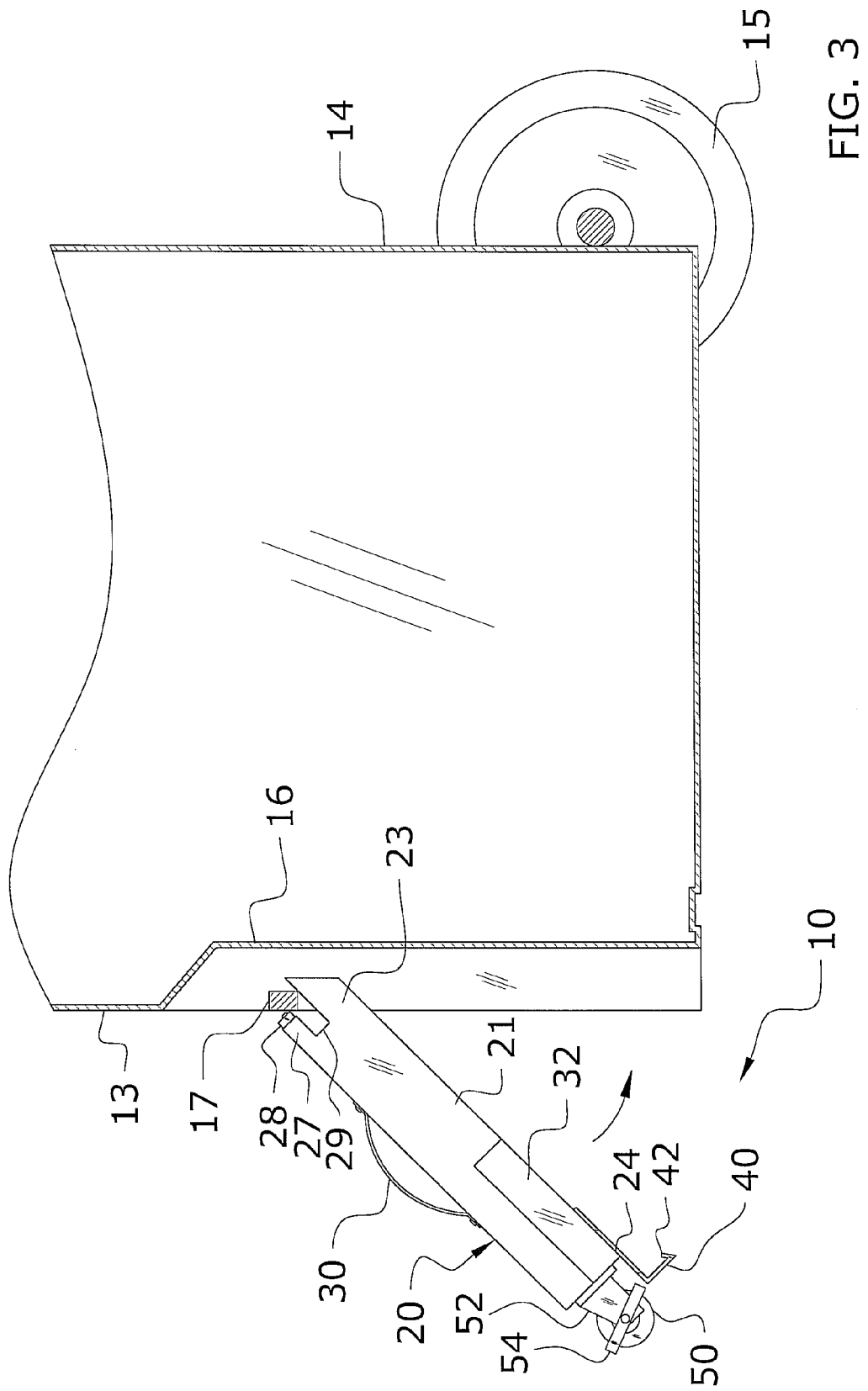
FIG. 3 is a side view of the present invention in a first step of attaching to a container.
Figure 4:
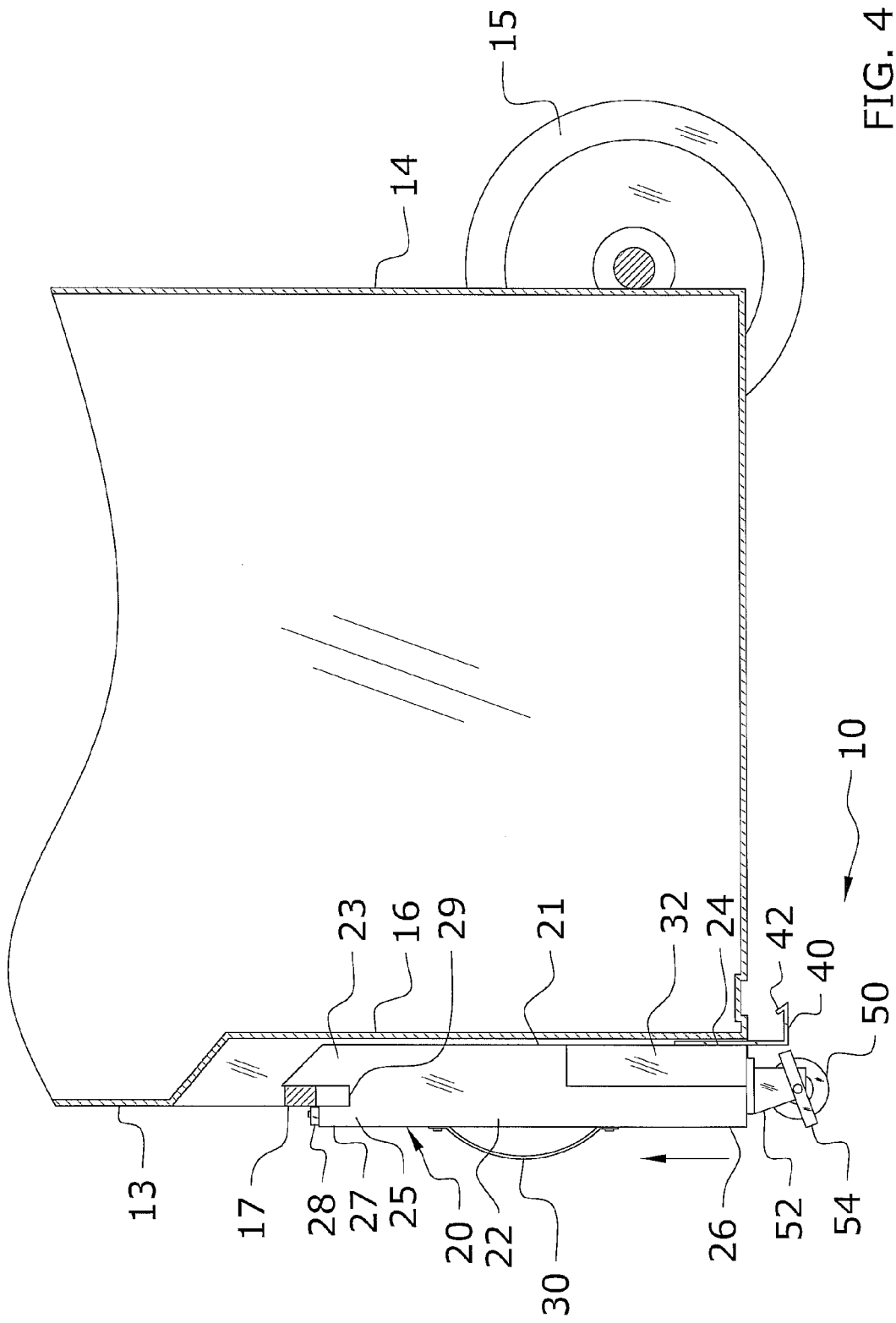
FIG. 4 is a side view of the present invention in a second step of attaching to the container.
Figure 5:
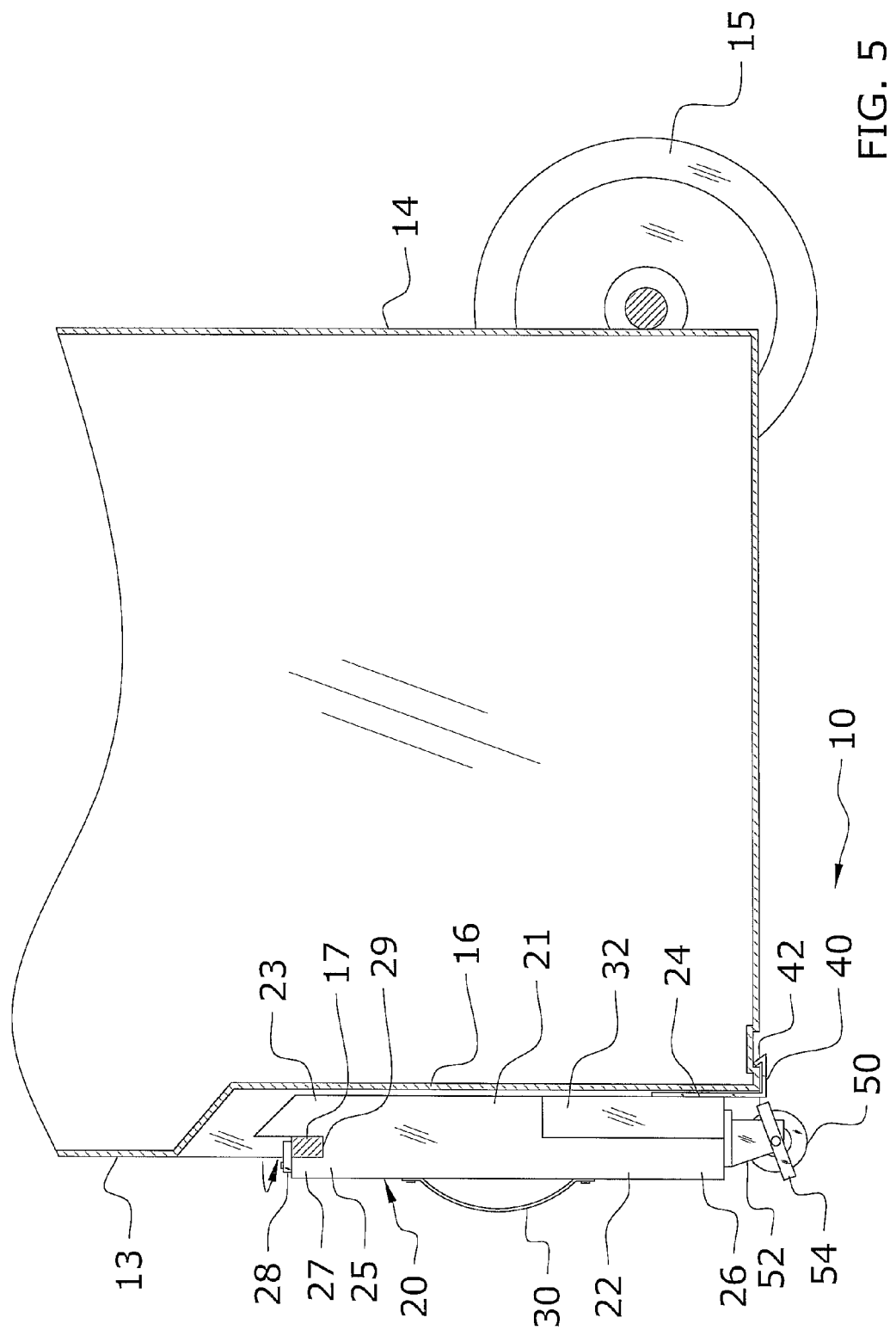
FIG. 5 is a side view of the present invention in a third step of attaching to the container.

The present invention preferably includes a lower securing member 40 extending from the support structure 20 to attach to the base of the container 12 as illustrated in FIGS. 3 through 5. The lower securing member 40 may be comprised of various materials, such as but not limited to plastic or metal. The lower securing member 40 serves to assist the support structure 20 in maintaining a straight upright configuration with respect to the container 12.

The lower securing member 40 preferably extends from the lower inner end 24 of the inner portion 21 opposite the outer portion 22. The lower securing member 40 further preferably extends downwardly past the lower inner end 24 as illustrated in FIGS. 3 through 5. The lower securing member 40 is preferably comprised of an L-shaped configuration. The lower securing member 40 includes a hook 42 to secure the lower securing member 40 upon the base of the container 12.

D. Wheel

The wheel 50 extends from the lower end 24, 26 of the support structure 20 as illustrated in FIGS. 1 through 6. The wheel 50 attaches to the support structure 20 via a connecting structure 52. The connecting structure 52 preferably allows the wheel 50 to swivel about the connecting structure 52 and also to freely rotate.

The connecting structure 52 and wheel 50 are further preferably comprised of a castor wheel configuration. The wheel 50 also includes a ball bearing structure to allow for easier maneuvering of the container 12. It is appreciated that the present invention may also include a plurality of wheels 50.

The wheel 50 may also include a brake 54 as illustrated in FIGS. 1 through 6. The brake 54 may be comprised of various configurations, such as but not limited to a standard castor wheel brake common in the art. The brake 54 provides a friction force against the wheel 50 when engaged.

E. Operation of Preferred Embodiment

In use, the first inner end of the inner portion 21 is extended within the recessed portion 16 and behind the support member 17 in an upward manner as illustrated in FIGS. 3 and 4. The upper securing member 27 is ensured to be rotated to an open position (i.e. parallel with the channel 29), wherein the support member 17 may be subsequently positioned within the channel 29. Once the support member 17 is positioned within the channel 29, the upper securing member 27 is rotated to a closed position (i.e. perpendicular the channel 29 and extending over the support member 17) to secure the support member 17 within the channel 29 as illustrated in FIG. 5.

The support structure 20 is also ensured to be tilted to an upright position (i.e. parallel with the longitudinal axis of the recessed portion 16 and the container 12). As the support structure 20 is positioned in the upright position, the hook 42 of the lower securing member 40 preferably extends under the base of the front portion 13 of the container 12 and subsequently secures the lower securing member 40 upon the base of the container 12 by extending over a lip or other lower structure of the base of the container 12.

If the container 12 is to be maneuvered, the brake 54 is rotated to an unlock position and the container 12 may be subsequently pushed or pulled, wherein the container 12 rolls on the front wheel 50 and the rear wheels 15. When the operator is finished transporting the container 12, the brake 54 may be reengaged to prevent the container 12 from rolling freely. The present invention may also be removed from the container 12 by reversing the previously described steps.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A container wheel attachment system, comprising:
   a container including a pair of rear wheels rotatable attached at a rear of said container and a recessed portion extending within a front of said container;
   wherein said container includes a support member within said recessed portion;
   a support structure including an inner portion, an outer portion and a channel;
   wherein said inner portion includes an upper inner end and a lower inner end and wherein said outer portion includes an upper outer end and a lower outer end;
   wherein said upper inner end is adjacent said upper outer end upon said support structure and wherein said lower inner end is adjacent said lower outer end upon said support structure;
   wherein said channel extends between said upper inner end of said inner portion and said upper outer end of said outer portion for engagement with said support member; and
   at least one wheel rotatably attached adjacent said lower inner end of said inner portion and said lower outer end of said outer portion for comprising a front wheel of said container;
   wherein a substantial portion of said support structure is positioned within said recessed portion.

2. The container wheel attachment system of claim 1, wherein said upper inner end extends upwardly past said upper outer end.

3. The container wheel attachment system of claim 1, wherein a first length of said inner portion is greater than a second length of said outer portion.

4. The container wheel attachment system of claim 1, wherein said outer portion includes an extending portion extending upwardly, wherein said extending portion and said inner portion define said channel.

5. The container wheel attachment system of claim 4, including an upper securing member extending from said extending portion and within said channel.

6. The container wheel attachment system of claim 5, wherein said upper securing member selectively rotates about said extending portion.

7. The container wheel attachment system of claim 1, wherein said lower inner end is flush with said lower outer end.

8. The container wheel attachment system of claim 1, wherein said upper inner end is comprised of a sloped configuration.

9. The container wheel attachment system of claim 1, wherein said channel is perpendicular to a longitudinal axis of said support structure.

10. The container wheel attachment system of claim 1, including a lower securing member extending from said lower inner end of said inner portion.

11. The container wheel attachment system of claim 10, wherein said lower securing member extends downwardly past said lower inner end of said inner portion.

12. The container wheel attachment system of claim 1, including a handle extending from said outer portion.

13. The container wheel attachment system of claim 1, wherein said at least one wheel is comprised of a castor wheel configuration.

14. The container wheel attachment system of claim 1, wherein said at least one wheel includes a brake.

15. The container wheel attachment system of claim 1, including a pair of spacer members extending outwardly from opposing sides of said inner portion.

16. A container wheel attachment system, comprising:

a refuse container including a pair of rear wheels rotatably attached at a rear of said container and a recessed portion extending within a front of said container;

a support structure positioned within said recessed portion, wherein said support structure extends along said recessed portion in a parallel manner, and wherein an inner portion of said support structure is positioned against an inner wall of said recessed portion;

wherein said support structure is comprised of a one-piece configuration;

wherein said support structure includes a lower securing member including a hook to secure a base of said support structure to a base of said container;

wherein said lower securing member is comprised of an L-shaped configuration;

wherein said lower securing member extends below said base of said support structure;

wherein said support structure includes a pair of spacer members extending from opposing sides of said support structure;

wherein said spacer members are positioned within said recessed portion to stabilize said support structure within said recessed portion;

a handle extending from an outer portion of said support structure;

wherein said outer portion and said inner portion of said support structure are integrally formed to comprise said one-piece configuration;

a castor wheel rotatably attached to said base of said support structure to form a front wheel of said container when said support structure is positioned within said recessed portion; and a brake attached to said castor wheel.

* * * * *